(12) United States Patent
Daandels et al.

(10) Patent No.: US 12,722,773 B2
(45) Date of Patent: Sep. 1, 2026

(54) FORWARD FAIRING, AIRCRAFT STRUCTURE, FLAP SUPPORT STRUCTURE AND AIRCRAFT

(71) Applicant: Airbus Operations GmbH, Hamburg (DE)

(72) Inventors: Dort Daandels, Hamburg (DE); Wolfgang Ehrhard, Hamburg (DE); Sönke Wunderlich, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 19/235,944

(22) Filed: Jun. 12, 2025

(65) Prior Publication Data

US 2025/0382048 A1 Dec. 18, 2025

(30) Foreign Application Priority Data

Jun. 14, 2024 (EP) .................................... 24182165

(51) Int. Cl.
*B64C 7/00* (2006.01)

(52) U.S. Cl.
CPC ...................................... *B64C 7/00* (2013.01)

(58) Field of Classification Search
CPC ........................................................ B64C 7/00
See application file for complete search history.

(56) References Cited

U.S. PATENT DOCUMENTS 9,227,722 B2 * 1/2016 Soenarjo ................... B64C 3/50
2009/0184204 A1 * 7/2009 Piehl ......................... B64C 7/00 428/116
2010/0243810 A1 * 9/2010 Lobo Barros ............. B64C 5/02 244/131
2019/0389560 A1 * 12/2019 Gruner ....................... B64C 3/28
2022/0402623 A1 * 12/2022 Daandels ............... B64D 29/06
2023/0348039 A1 * 11/2023 Gibbert ..................... B64C 7/00

FOREIGN PATENT DOCUMENTS

CN 214267941 U 9/2021

OTHER PUBLICATIONS

European Search Report for corresponding European Patent Application No. 24182165.1 dated Dec. 17, 2024.

* cited by examiner

*Primary Examiner* — Justin M Benedik
(74) *Attorney, Agent, or Firm* — Greer, Burns & Crain, Ltd.

(57) ABSTRACT

A forward fairing for an aircraft. The forward fairing includes a fairing shell and an attachment member. The attachment member includes a protrusion that is integrally formed with the fairing shell and a spigot that is coupled to the protrusion. Also, an aircraft structure with such a fairing, a flap support structure with such a fairing, and an aircraft with such a fairing.

12 Claims, 3 Drawing Sheets

FORWARD FAIRING, AIRCRAFT STRUCTURE, FLAP SUPPORT STRUCTURE AND AIRCRAFT

CROSS-REFERENCES TO RELATED APPLICATIONS

This application claims the benefit of European Patent Application Number 24182165.1 filed on Jun. 14, 2024, the entire disclosure of which is incorporated herein by way of reference.

FIELD OF THE INVENTION

The invention relates to a forward fairing for an aircraft, an aircraft structure with the forward fairing, a flap support structure with the aircraft structure and an aircraft with the aircraft structure.

BACKGROUND OF THE INVENTION

An aircraft fairing is a structure whose primary function is to produce a smooth outline and reduce aerodynamic drag. A fairing can serve as a cover for gaps and spaces between parts of an aircraft in order to reduce aerodynamic drag and interference drag and to also improve appearance. The fairing is commonly non-structural and attached to a further structure of the aircraft.

U.S. Pat. No. 9,227,722 B2 describes a flap support structure for an aircraft wing which supports an aerodynamic fairing. The flap support structure has a flap support beam including an aerodynamic fairing and a drive unit including a universal support structure which rotatably receives a drive shaft connected to a drive arm for moving the trailing edge flap. The universal support structure also forms part of the flap support beam and supports the aerodynamic fairing.

It is desirable to provide a fairing that can be easily attached to a further structure of the aircraft.

SUMMARY OF THE INVENTION

The invention provides a forward fairing for an aircraft. The forward fairing comprises a fairing shell and an attachment device. The aft attachment device comprises a protrusion that is integrally formed with the fairing shell and a spigot that is coupled to the protrusion.

The spigot is used to mount the shell onto a support structure of the aircraft. An integrated protrusion in the fairing shell is provided. This reduces the number of parts that have to be assembled. Additionally, a fairing with a smoother outer surface can be provided as an additional fastening between the protrusion and the shell can be avoided. Thus, aerodynamic drag can be reduced.

For example, the protrusion and fairing shell may be integrally formed using molding fabrication methods or by additive manufacturing methods, such as three-dimensional printing, in which the desired structure of the shell and protrusion is successively built-up layer by layer. Thus, a joint between two separate parts, i.e., between the protrusion and shell, is avoided.

The protrusion can also be considered to be a bracket.

In an embodiment, the protrusion has a substantially cylindrical form with a base and an end face. The base of the protrusion protrudes from an inner surface of the fairing shell. The upward part of the protrusion that protrudes from the inner surface may extend substantially perpendicularly to the inner surface or at an inclined angle to the inner surface.

In an embodiment, the base of the protrusion comprises a skirt that merges into the inner surface of the fairing shell. The skirt provides a smooth transition between the upward part of the protrusion and the inner surface of the shell. This arrangement distributes loads more homogeneously.

In an embodiment, the spigot has a shaft, a neck and a head. The head is laterally larger than the shaft and the neck and the neck is laterally smaller than the shaft and the head. In an embodiment, the shaft, the neck and the head of the spigot are each substantially cylindrical and the head protrudes radially from the neck.

In an embodiment, the protrusion comprises a recess formed in its end face. The recess comprises an inner thread and the shaft of the spigot comprises an external thread. This enables the spigot to be coupled to the protrusion by screwing the spigot into the protrusion. The shaft of the spigot is engaged with the protrusion by the interlocked outer thread and inner thread.

In alternative embodiment, the spigot is integral with the protrusion and comprises a neck and a head protruding from the end face of the protrusion. This embodiment has the advantage that the number of parts that are to be assembled is further reduced.

The forward fairing may have a forward end and an aft end and the attachment device may be located towards the aft end. The forward fairing may be elongate and have a longitudinal axis that extends between the forward end and the aft end and the attachment device may be located towards the aft end. The forward fairing may further comprise a reinforcement structure, for example ribs and/or stringers that are attached to the inner surface of the shell.

The fairing shell and the integral protrusion may be formed of a fiber reinforced plastic, for example carbon fiber reinforced plastic. These materials provide high strength at a low weight. Furthermore, these materials can be used in an additive manufacturing process to form the shell and integrated protrusion.

The invention also provides an aircraft structure which comprises the forward fairing according to any one of the embodiments described herein and a support structure comprising a key slot.

In an embodiment, the key slot is formed in a U-shaped bracket that is attached to the support structure. The U-shaped bracket may be separate from the support structure and attached to the support structure by one or more additional fastenings or may be integral with the support structure.

In an embodiment, the key slot is elongated and comprises a first enlarged aperture at a first end and a second enlarged aperture at a second end opposing the first end. The first enlarged aperture has a greater diameter than the second enlarged aperture.

In an embodiment, the key slot is located such that the fairing shell is engageable with the support structure by forward and aft movement of the fairing shell relative to the support structure.

In an embodiment, the key slot is located such that the larger first enlarged aperture is positioned forward of the smaller second enlarged aperture with respect to the aircraft. This enables the forward fairing to be fitted to the support structure by a movement in the direction of the aft of the aircraft.

In an embodiment, the head of the spigot is insertable in the first enlarged aperture of the key slot is, therefore, laterally smaller than the first enlarged aperture. The head of the spigot is laterally larger than the second enlarged aperture such that the head is supported by the bracket surface surrounding the second enlarged aperture of the key slot in the mounted position of the fairing on the support structure.

In an embodiment, the neck is laterally smaller than the second enlarged aperture and is located in the second enlarged aperture of the key slot in the mounted position of the fairing on the support structure.

The invention also provides a flap support structure comprising the aircraft structure according to any one of the embodiments described herein.

The invention also provides an aircraft wing comprising the aircraft structure according to any one of the embodiments described herein.

The invention also provides an aircraft comprising the aircraft structure according to any one of the embodiments described herein.

To summarize, the protrusion (bracket part) on the fairing side is integrated into the fairing shell and thus results in a reduction in the number of parts and simplified assembly. Instead of manufacturing several parts and assembling them with fasteners the fairing shell and the bracket part are integral. For example, additive manufacturing techniques, such as three-dimensional printing techniques may be used to produce the fairing shell and protrusion in one manufacturing step.

The aft attachment of the forward fairing keeps the forward fairing in place in direction of flight. The aft part of the forward fairing is also able to move in chord direction. The rotation canter is in the forward connection of the forward fairing. Once the spigot is in place in the smaller part of the key hole, the fairing can rotate round the axial axis of the spigot in the integral protrusion.

Because of the integral design of the fairing shell and protrusion, fewer parts are needed. This reduces the cost of part and of assembly. The weight is reduced as there is no overlap in assembly areas and no flanges sized by minimum edge distance of fastener holes are used. There is also a reduction in lead time as no assembly time is needed in the planning process. A further advantage is that a smoother outer surface can be provided, also for a double curved surface, since the outer surface is not interrupted, e.g., by the flat heads of the countersunk fasteners. At the same time, kinematic movement remains.

BRIEF DESCRIPTION OF THE DRAWINGS

Embodiments of the invention are described in more detail with reference to the accompanying schematic drawings that are listed below.

DETAILED DESCRIPTION OF THE PREFERRED EMBODIMENTS

Figure 1:
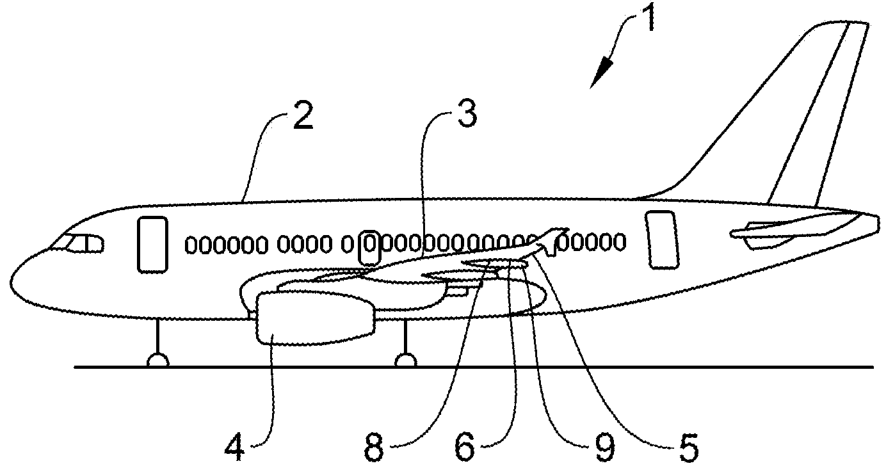
FIG. 1 depicts an aircraft.

FIG. 1 depicts a side view of an aircraft 1 comprising a fuselage 2, two opposing wings 3 and under-wing mounted engines 4. Each wing 3 has moveable trailing edge flaps 5 mounted to the wing fixed trailing edge. The flaps 5 are supported by and moveable with respect to the fixed portion of the wing 3 by flap support structures 6. Whilst the aircraft shown in FIG. 1 is a commercial transport aircraft, the invention is applicable to a wide variety of aircraft types. It is also applicable to aircraft with engines mounted other than under the wing, e.g. aft mounted engines.

The flap support structure 6 generally includes a flap support beam 7, a forward fairing 8 and a moveable aft fairing 9. The aft fairing 9 is fixed with respect to the flap 5 and moves with the flap 5 between a retracted position adjacent the wing fixed trailing edge and one or more extended positions.

Figure 2A:
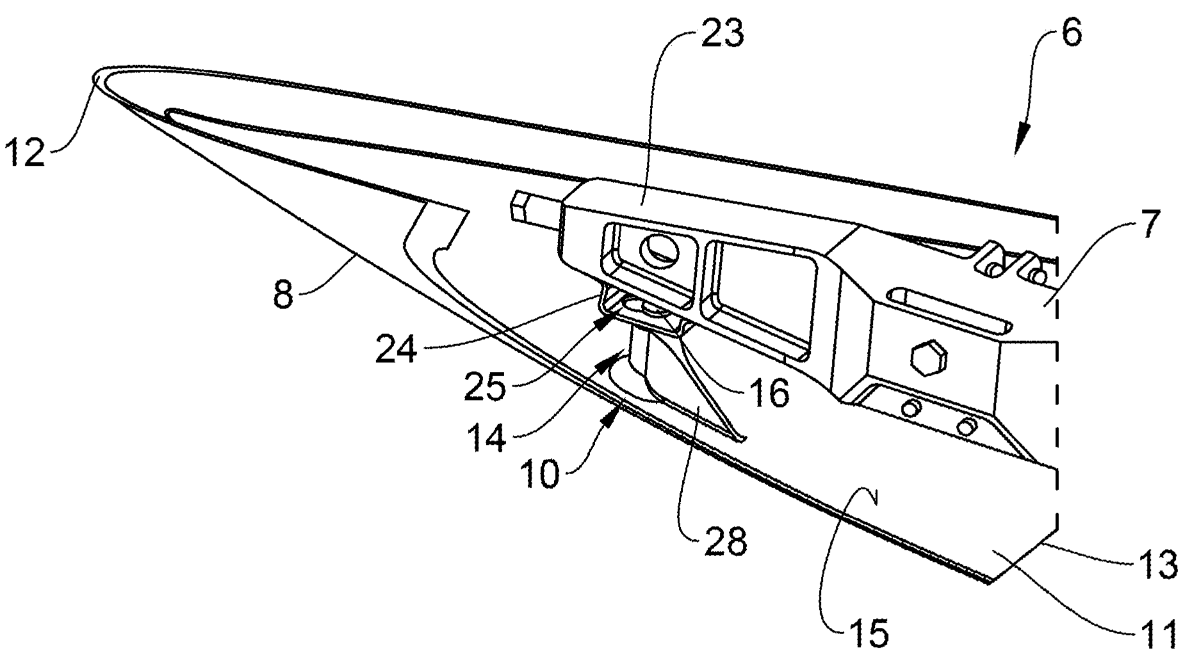
FIG. 2A depicts a perspective view of a forward fairing of an aircraft and an attachment structure.
Figure 2B:
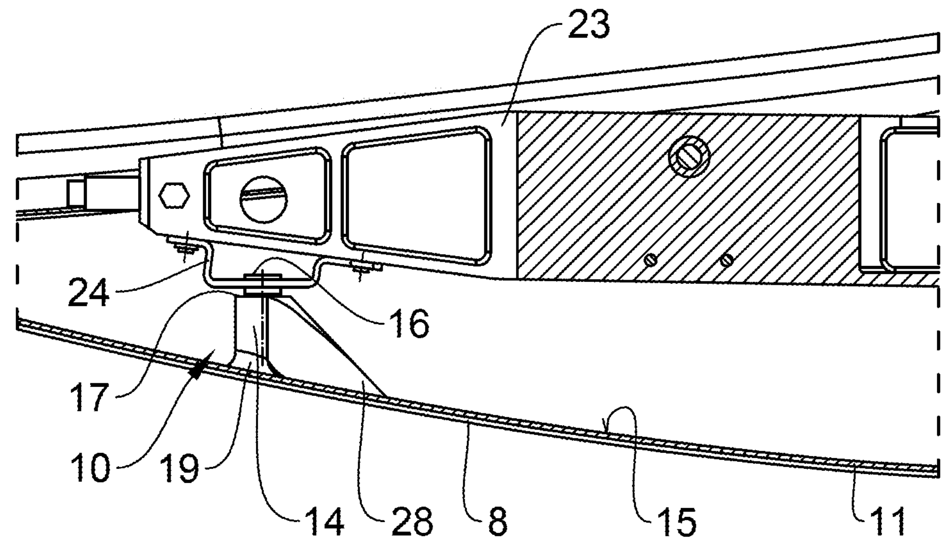
FIG. 2B depicts a cross-sectional view of the forward fairing and attachment structure of FIG. 2A.
Figure 3:
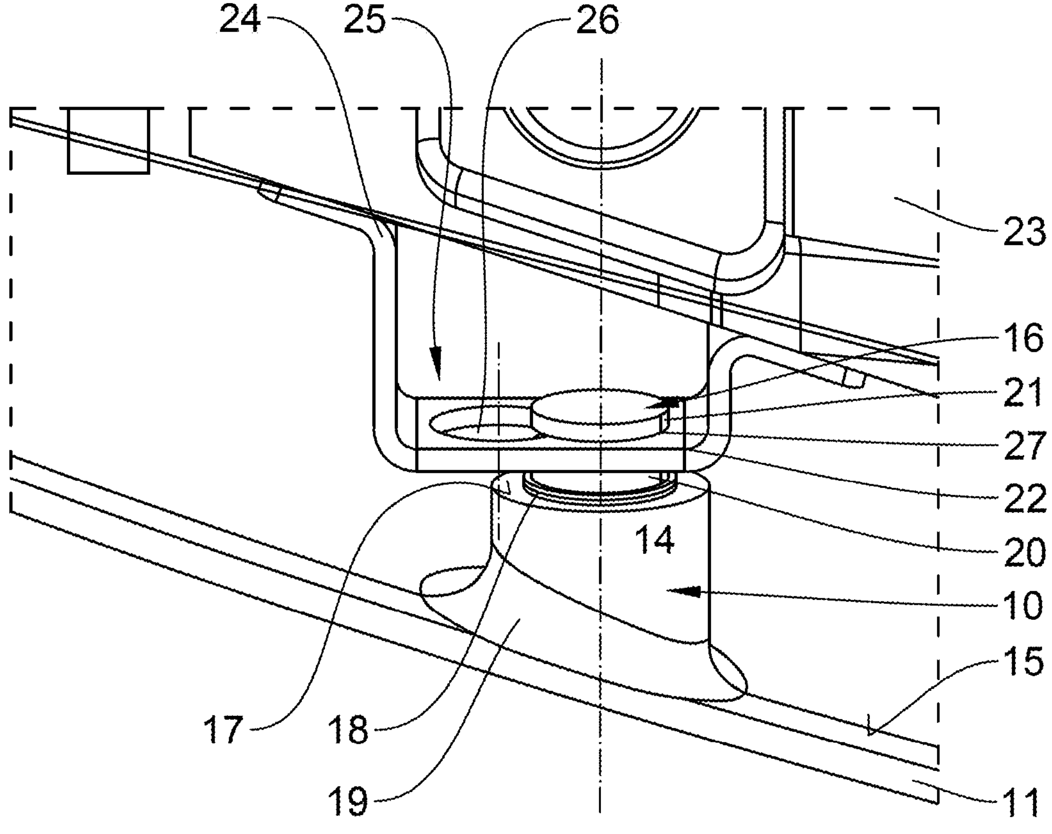
FIG. 3 depicts an enlarged view of the attachment structure of FIGS. 2A and 2B.

The forward fairing 8 is attached to the flap support beam 7 by way of the attachment structure 10 illustrated in FIGS. 2 and 3, whereby FIG. 2A depicts a perspective view, FIG. 2B a cross-sectional view of the forward fairing 8 and attachment structure 10 and FIG. 3 illustrates an enlarged view of the attachment structure 10 of FIG. 2.

The forward fairing 8 comprises a shell 11 extending along a longitudinal axis between a forward end 12 and an aft end 13. The attachment structure 10 comprises a protrusion 14 that is integrally formed with the shell 11, in particular with the inner surface 15 of the shell 11 and a spigot 16 that is coupled to the protrusion 14. The protrusion 14 may also be referred to as a bracket.

The protrusion 14 protrudes from the inner surface 15 of the shell 11. In an embodiment, the protrusion 14 may extend substantially (i.e., +/−10%) perpendicularly to the inner surface 15. Alternatively, the protrusion may extend at an inclined angle, i.e. less than 90°, to the inner surface 15. The dimensions of the protrusion 14 and its angle of protrusion from the inner surface 15 may be selected depending on the position of the protrusion 14 on the support structure 23 of the aircraft 1 to which the fairing 8 is to be connected.

The protrusion 14 is substantially cylindrical and comprises a recess 18 in its end surface 17 which comprises an internal thread. The base of the protrusion 14 comprises a skirt 19 which merges into the inner surface 15 of the shell 11 to create a smooth transition between the outer surface of the protrusion 14 and the inner surface 15 of the shell 11. The skirt 19 forms a radial transition that is concave.

In some embodiments, the attachment structure 10 may further include a support section 28 which also protrudes from the inner surface 15 of the shell 11 and which abuts an outer side wall of the substantially cylindrical protrusion 14. The support section 28 may have a substantially triangular footprint and extend from the forward to aft direction with a decreasing height so as to provide support for the protrusion 14 during mounting of the forward fairing 8 onto the flap support beam 7. The support section 28 may be integral with the shell 11 and may also be integral with the protrusion 14.

The spigot 16 comprises a substantially cylindrical body or shaft 20 with an external thread so that the shaft 20 can be screwed into the recess 18 of the protrusion 14 to attach the spigot 16 to the protrusion 14 and to the shell 11 of the forward fairing 8. The spigot 16 comprises a head 21 and a neck 22 that is located between the shaft 20 and the head 21. The head 21 is laterally larger than the shaft 20 and the neck 22 and the neck 22 is laterally smaller than the shaft 20 and the head 21. The shaft 20, the neck 22 and the head 21 are each substantially cylindrical and the head 21 protrudes radially from the neck 22. The neck 22 has a smaller diameter than that of the shaft 20 and the head 21 has a larger diameter than that of the neck 22 and of the shaft 20.

The flap support beam 7 comprises a support structure 23 to which the shell 11 is to be attached. This support structure 23 comprises a U-shaped bracket 24 comprising a key slot 25 also known as a keyhole slot which comprises an elongate aperture. The key slot 25 comprises a first enlarged aperture 26 at a first end and a second enlarged aperture 27 at a second end that opposes the first end. The first and second enlarged apertures 26, 27 are each substantially circular. The second enlarged aperture 27 has a smaller diameter than the first enlarged aperture 26.

The first and second enlarged apertures 26, 27 and the head 21 and neck 22 of the spigot 16 are sized such that the head 21 can pass through the first enlarged aperture 26 but not through the second enlarged aperture 27 and such that the neck 22 can pass through the second enlarged aperture 26. Thus, the shell 11 can be attached to the support structure 23 by inserting the head 21 of the spigot 16 through the first enlarged aperture 26, moving the head 21 and the shell 11 from the first end towards the second end of the elongated key slot 25 into the second enlarged aperture 27 so that the neck 22 is located in the second enlarged aperture 27. In this mounted position, the neck 22 is supported by the bracket surface around the second enlarged aperture 27 so that the shell 11 and fairing 8 are mounted on the support structure 23.

The elongate key slot 25 has a longitudinal axis. This enables the aft of the shell 11 to be attached to the support structure 23 by moving the shell 11 relative to the key slot 25 in one direction. In an embodiment, the longitudinal axis of the key slot 25 extends in the direction from the front to the rear of the aircraft. Thus, the shell 11 can be attached to the support structure 23 by moving the shell 11 relative to the key slot 25 in the direction from the front to the rear of the aircraft 1.

The spigot 16 is moveable in the key slot 25 between a first position in the first enlarged aperture 26 and a second position in the second reduced diameter aperture 27. In the first position, the spigot 16 and shell 11 is able to be removed from the support structure 23, from example perpendicularly away from the U-shaped bracket 24. In the second position, the spigot 16 and shell 11 is secured to the support structure 23. The key slot 25 has a first part (enlarged aperture 26) into which the spigot 16 can be inserted/removed, and a second part (enlarged aperture 27) in which the spigot 16 cannot be inserted or removed.

The forward fairing 8 is rotatable about the spigot 16, i.e. it rotate around the z axis. This rotational movement allows aft attachment in the chord direction. The chord direction is the direction between the leading edge and trailing edge of the wing 3.

In an alternative embodiment, the spigot 16 is integral with the protrusion 14. In this embodiment, the neck 22 and head 21 protrude from the end face 17 of the bracket 14. In this alternative embodiment, the attachment structure 10 has a similar outer appearance to that shown in FIG. 2A, 2B or 3.

A fairing 8 with an integrated protrusion 14 is provided. Additive manufacturing techniques, such as three-dimensional printing techniques may be used to produce the fairing shell 11 and protrusion 14 in one manufacturing step. The number of parts is reduced and assembly simplified since, instead of assembling several parts with additional fasteners, the fairing shell 11 and the protrusion 14 are integral. Thus, the fairing shell 11 can be mounted onto the support structure 23 in a simpler movement by inserting the spigot head 21 into the larger aperture 26 of the key slot 25 and sliding the shell 11 and spigot 16 into the smaller aperture 27 of the key slot 25.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 aircraft
2 fuselage
3 wing
4 engine
flap
6 flap support structure
7 flap support beam
8 forward fairing
9 aft fairing
attachment structure
11 shell
12 forward end
13 aft end
14 protrusion
inner surface
16 spigot
17 end face
18 recess
19 skirt
shaft
21 head
22 neck
23 support structure
24 U-shaped bracket
key slot
26 first enlarged aperture
27 second enlarged aperture
28 support

The invention claimed is:

1. A forward fairing for an aircraft, the forward fairing comprising:
a fairing shell; and,
an attachment device, the attachment device comprising:
a protrusion integrally formed with the fairing shell; and,
a spigot coupled to the protrusion,
wherein the protrusion has a substantially cylindrical form with a base and an end face, wherein the base of the protrusion protrudes from an inner surface of the fairing shell,
wherein the protrusion comprises a recess formed in the end face, the recess comprising an inner thread, wherein a shaft of the spigot comprises an external thread,
wherein the spigot has a shaft, a neck, and a head,
wherein the head is laterally larger than the shaft and the neck, and wherein the neck is laterally smaller than the shaft and the head.

2. The forward fairing according to claim 1, wherein the base of the protrusion comprises a skirt that merges into the inner surface of the fairing shell.

3. The forward fairing according to claim 1, wherein the spigot is integral with the protrusion and the neck and the head protrude from the end face of the protrusion.

4. The forward fairing according to claim 1, wherein the shaft, the neck, and the head are each substantially cylindrical and the head protrudes radially from the neck.

5. An aircraft structure comprising:

the forward fairing of claim 1; and a support structure comprising a key slot.

6. The aircraft structure according to claim 5, wherein the key slot is elongated and comprises a first enlarged aperture at a first end and a second enlarged aperture at a second end opposing the first end, wherein the first enlarged aperture has a greater diameter than the second enlarged aperture.

7. The aircraft structure according to claim 5, wherein the key slot is located such that the fairing shell is configured to engage with the support structure by forward and aft movement of the fairing shell relative to the support structure.

8. A flap support structure comprising:

the aircraft structure of claim 5.

9. An aircraft comprising:

the aircraft structure of claim 5.

10. An aircraft structure comprising:

the forward fairing; and a support structure comprising a key slot, wherein the forward fairing comprises:

a fairing shell; and, an attachment device, the attachment device comprising:

a protrusion integrally formed with the fairing shell; and, a spigot coupled to the protrusion, wherein the key slot is formed in a U-shaped bracket attached to the support structure.

11. An aircraft structure comprising:

the forward fairing; and a support structure comprising a key slot, wherein the forward fairing comprises:

a fairing shell; and, an attachment device, the attachment device comprising:

a protrusion integrally formed with the fairing shell; and, a spigot coupled to the protrusion, wherein the key slot is elongated and comprises a first enlarged aperture at a first end and a second enlarged aperture at a second end opposing the first end, wherein the first enlarged aperture has a greater diameter than the second enlarged aperture, wherein a head of the spigot is configured to be inserted in the first enlarged aperture of the key slot and is larger than the second enlarged aperture such that the head is supported by a bracket surface surrounding the second enlarged aperture of the key slot in a mounted position of the forward fairing on the support structure.

12. The aircraft structure according to claim 11, wherein a neck of the spigot is laterally smaller than the second enlarged aperture and is located in the second enlarged aperture of the key slot in the mounted position of the forward fairing on the support structure.

* * * * *